(12) United States Patent
Hasunuma et al.

(10) Patent No.: US 11,986,961 B2
(45) Date of Patent: May 21, 2024

(54) MACHINE LEARNING MODEL OPERATION MANAGEMENT SYSTEM AND MACHINE LEARNING MODEL OPERATION MANAGEMENT METHOD

(71) Applicant: KAWASAKI JUKOGYO KABUSHIKI KAISHA, Kobe (JP)

(72) Inventors: Hitoshi Hasunuma, Kobe (JP); Jun Yamaguchi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 337 days.

(21) Appl. No.: 17/434,304

(22) PCT Filed: Feb. 27, 2020

(86) PCT No.: PCT/JP2020/008150
§ 371 (c)(1),
(2) Date: Aug. 26, 2021

(87) PCT Pub. No.: WO2020/175643
PCT Pub. Date: Sep. 3, 2020

(65) Prior Publication Data
US 2022/0152823 A1 May 19, 2022

(30) Foreign Application Priority Data
Feb. 28, 2019 (JP) .................................. 2019-037053

(51) Int. Cl.
*B25J 9/16* (2006.01)
*G05B 13/02* (2006.01)
(Continued)

(52) U.S. Cl.
CPC ............. *B25J 9/1656* (2013.01); *B25J 9/163* (2013.01); *G05B 13/0265* (2013.01); *G06F 21/10* (2013.01)

(58) Field of Classification Search
CPC ..... B25J 9/1656; B25J 9/163; G05B 13/0265; G05B 19/042; G06F 21/10; G06F 21/6209; G06N 3/084
See application file for complete search history.

(56) References Cited

U.S. PATENT DOCUMENTS 9,302,393 B1 * 4/2016 Rosen .................... G06N 3/008
10,953,541 B2 * 3/2021 Zavesky ................ B25J 9/1653
(Continued)

FOREIGN PATENT DOCUMENTS

DE 102018210957 B4 * 5/2021 ............. B25J 19/00
JP 2017-30135 A 2/2017
(Continued)

OTHER PUBLICATIONS

Mar. 31, 2020 International Search Report issued in International Patent Application No. PCT/JP2020/008150.

*Primary Examiner* — Adam R Mott
*Assistant Examiner* — Heather J Keniry
(74) *Attorney, Agent, or Firm* — Oliff PLC (57) ABSTRACT

A machine learning model operation management system includes a model building server and an operation server. The model building server builds a trained machine learning model based on received training data. When the trained machine learning model stored in a robot controller operates for determining the operation of a robot, the operation server receives operation information generated by the robot controller. Data of the trained machine learning model built by the model building server is assigned with model identification information that uniquely identifies the trained machine learning model. The robot controller makes an external inquiry as to whether or not it has permission to use the trained machine learning model stored in itself, and if it has the permission to use, it makes the trained machine
(Continued)

learning model available for use. The operation server stores the operation information in association with the model identification information.

14 Claims, 3 Drawing Sheets

(51) Int. Cl.
*G05B 19/042* (2006.01)
*G06F 21/10* (2013.01)
*G06F 21/62* (2013.01)
*G06N 3/084* (2023.01)

(56) References Cited

U.S. PATENT DOCUMENTS

| | | | |
|---|---|---|---|
| 2017/0285584 A1* | 10/2017 | Nakagawa | G05B 13/027 |
| 2018/0326584 A1 | 11/2018 | Wang et al. | |
| 2019/0163667 A1* | 5/2019 | Feuz | G06N 20/00 |
| 2020/0027033 A1* | 1/2020 | Garg | G06F 17/18 |
| 2020/0082056 A1 | 3/2020 | Hasegawa | |
| 2020/0139539 A1* | 5/2020 | Hasunuma | G06N 3/08 |

FOREIGN PATENT DOCUMENTS

| | | |
|---|---|---|
| JP | 2017-185577 A | 10/2017 |
| JP | 2017-199124 A | 11/2017 |
| JP | 2017-215898 A | 12/2017 |
| JP | 2018-153873 A | 10/2018 |
| JP | 2018-187746 A | 11/2018 |
| TW | 201905729 A | 2/2019 |
| WO | 2018/216379 A1 | 11/2018 |

\* cited by examiner

MACHINE LEARNING MODEL OPERATION MANAGEMENT SYSTEM AND MACHINE LEARNING MODEL OPERATION MANAGEMENT METHOD

TECHNICAL FIELD

The present invention relates mainly to an operation management system for a machine learning model.

BACKGROUND ART

Conventional robot control devices equipped with a machine learning device capable of constructing a model for a work operation of a robot are known. PTL 1 discloses a robot control device of this type.

The robot system of PTL 1 is equipped with a machine learning device capable of learning, without human intervention, an optimal motion of a robot when picking a workpiece placed in a clutter. PTL 1 describes that the machine learning device has a learning model for training a workpiece picking operation and that the learning model can be shared by multiple robots.

PRIOR-ART DOCUMENTS

Patent Documents

PTL 1: Japanese Patent publication 2017-30135

SUMMARY OF THE INVENTION

Problems to be Solved by the Invention

It is considered that the training data which records the situation in detail by the sensor to make the robot learn, and the data of the learning model built by the training data have an important value from the viewpoint of security. However, PTL 1 does not mention how to manage such information. Therefore, in PTL 1, there is a risk of losing business opportunities due to, for example, unauthorized copying and use of the data of the learning model, and improvement is needed.

The present invention is made in view of the circumstances described above, and an object of the present invention is to appropriately manage the operation of trained machine learning models while ensuring the security of important information.

Means for Solving the Problems

The problem to be solved by the present invention is as described above, and the means to solve the problem and the effect thereof are described below.

According to a first aspect of the present invention, a machine learning model operation management system having the following configuration is provided. That is, the machine learning model operation management system includes a model building server and an operation server. The model building server receives training data. The training data is data for making a machine learning model to train an operation of a robot. The model building server builds a trained machine learning model based on the training data. When the trained machine learning model stored in a robot controller operates for determining the operation of the robot, the operation server receives operation information generated by the robot controller. The robot controller inquires whether the robot controller has permission to use the trained machine learning model stored in the robot controller by sending model identification information that uniquely identifies the trained machine learning model. If the robot controller has the permission to use, the robot controller makes the trained machine learning model available for use. The operation server stores the operation information in association with information that uniquely identifies the trained machine learning model.

According to a second aspect of the present invention, a machine learning model operation management system having the following configuration is provided. That is, the machine learning model operation management system includes a model building server, an operation server, and a management server. The model building server receives training data. The training data is data for making a machine learning model to train an operation of a robot. The model building server builds a trained machine learning model based on the training data. When the trained machine learning model stored in a robot controller operates for determining the operation of the robot, the operation server receives operation information generated by the robot controller. The management server can communicate with the robot controller. At least one of the management server and the operation server determines whether or not the robot controller has permission to use the trained machine learning model. At least one of the management server and the operation server allows the robot controller having the permission to use the trained machine learning model. The operation server stores the operation information in association with information that uniquely identifies the trained machine learning model.

According to a third aspect of the present invention, machine learning model operation management method as the following is provided. That is, the machine learning model operation management method includes a model building process, a preparation process, and an operation information receiving process. In the model building process, a model building server receives training data. The training data is data for making a machine learning model to train an operation of a robot. The model building server builds a trained machine learning model based on the training data. In the preparation process, a robot controller inquires whether the robot controller has permission to use the trained machine learning model stored in the robot controller by sending model identification information that uniquely identifies the trained machine learning model. If the robot controller has the permission to use, the robot controller makes the trained machine learning model available for use. In the operation information receiving process, when the trained machine learning model stored in the robot controller operates for determining the operation of the robot, an operation server receives operation information generated by the robot controller. In the operation information receiving process, the operation server stores the operation information in association with information that uniquely identifies the trained machine learning model.

This allows the model building server to be operated at a location that the user can trust. Therefore, the user can send the training data with confidence to the model building server to build the trained machine learning model. On the other hand, the operation server does not store the data of the trained machine learning model, but only uses the information that uniquely identifies the model. In addition, by not including highly confidential information in the operation information stored in the operation server, the necessity of locating the operation server in a place with strict security becomes small. As a result, the construction cost and the running cost of the system can be reduced.

Effects of the Invention

According to the present invention, the operation and management of the trained machine learning model can be appropriately performed while ensuring security for important information.

EMBODIMENT FOR CARRYING OUT THE INVENTION

Figure 1:
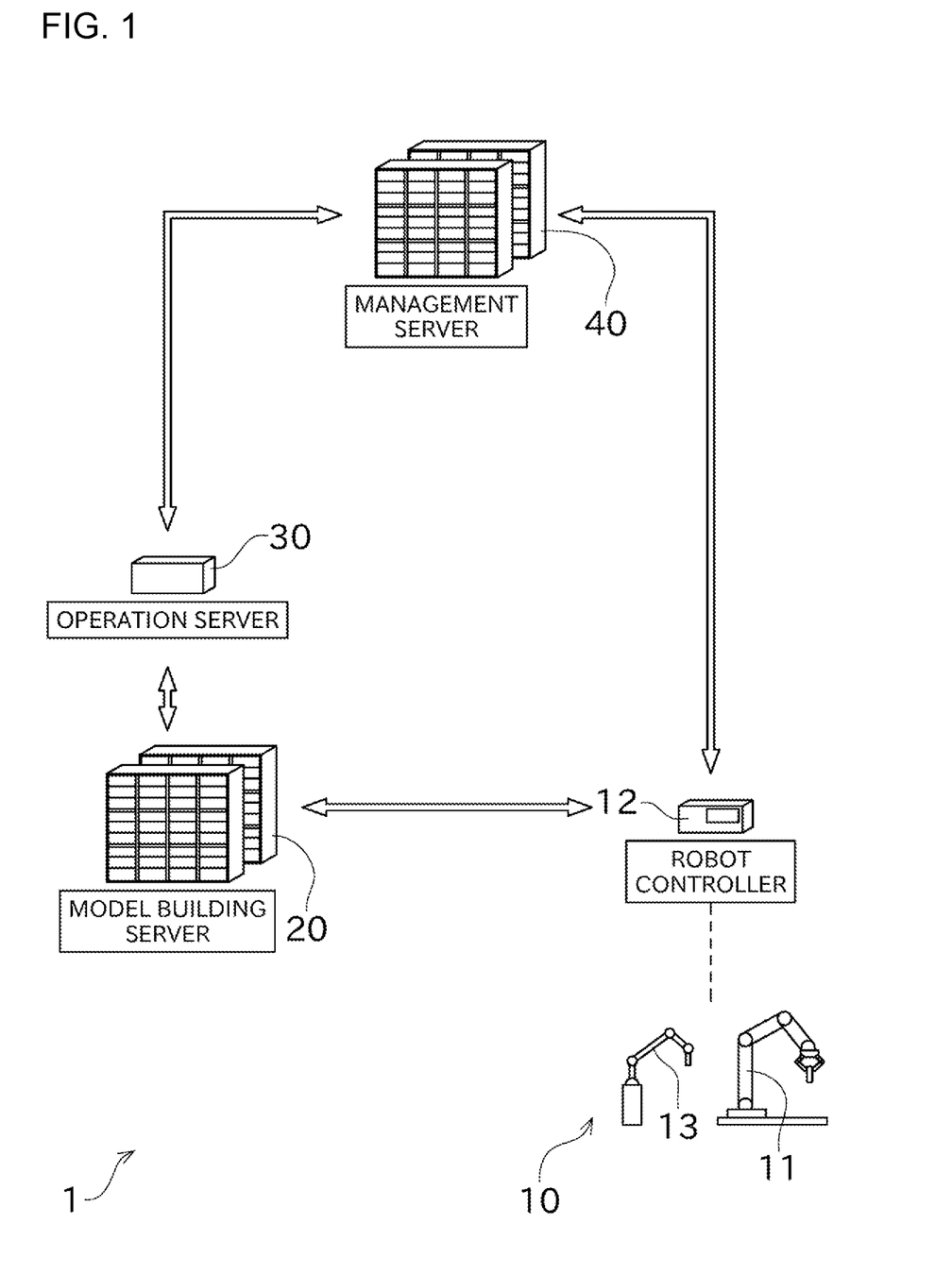
FIG. 1 is a schematic diagram showing the overall structure of the machine learning model operation management according to one embodiment of the present invention.
Figure 2:
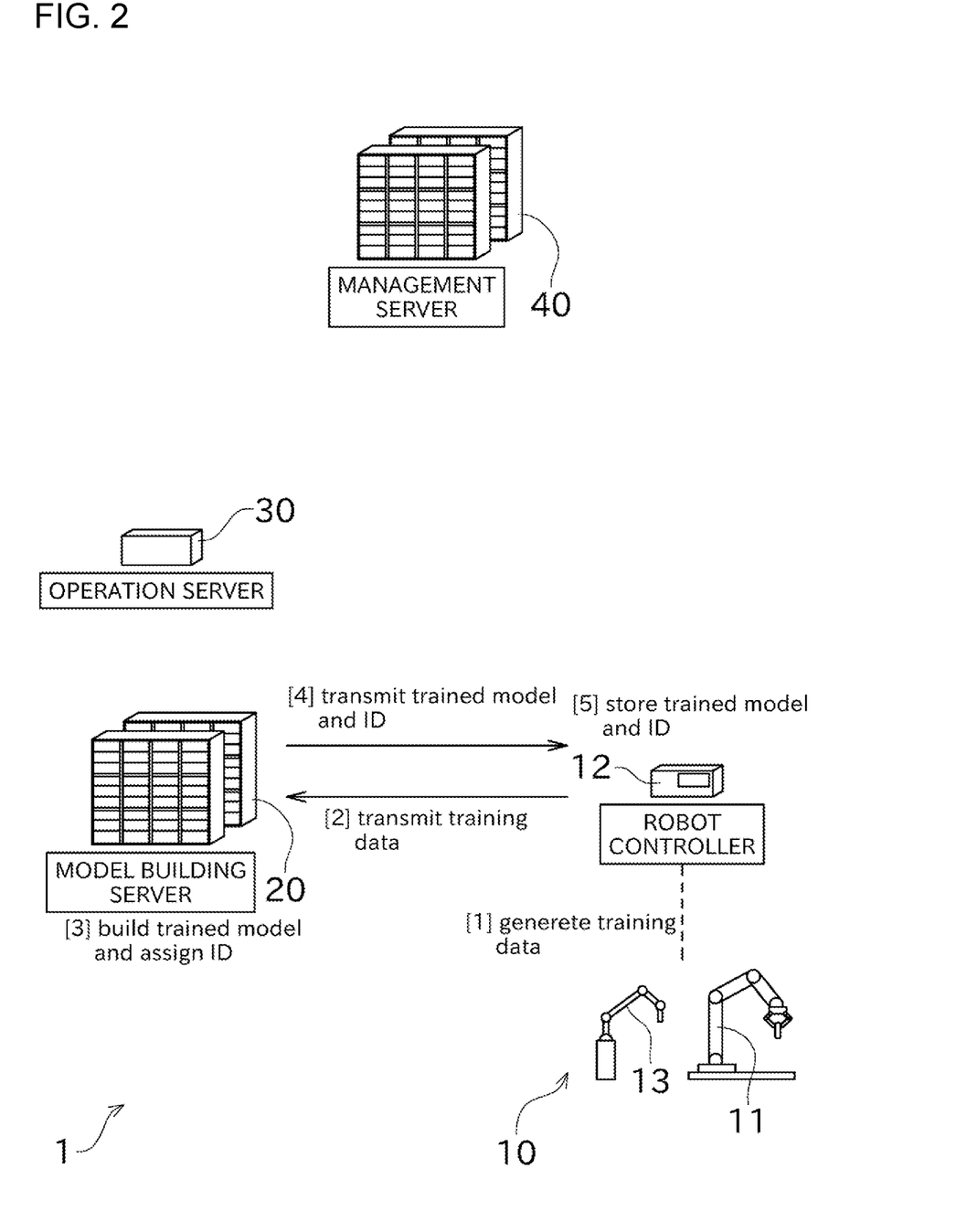
FIG. 2 is a schematic diagram illustrating a process for building a trained model.
Figure 3:
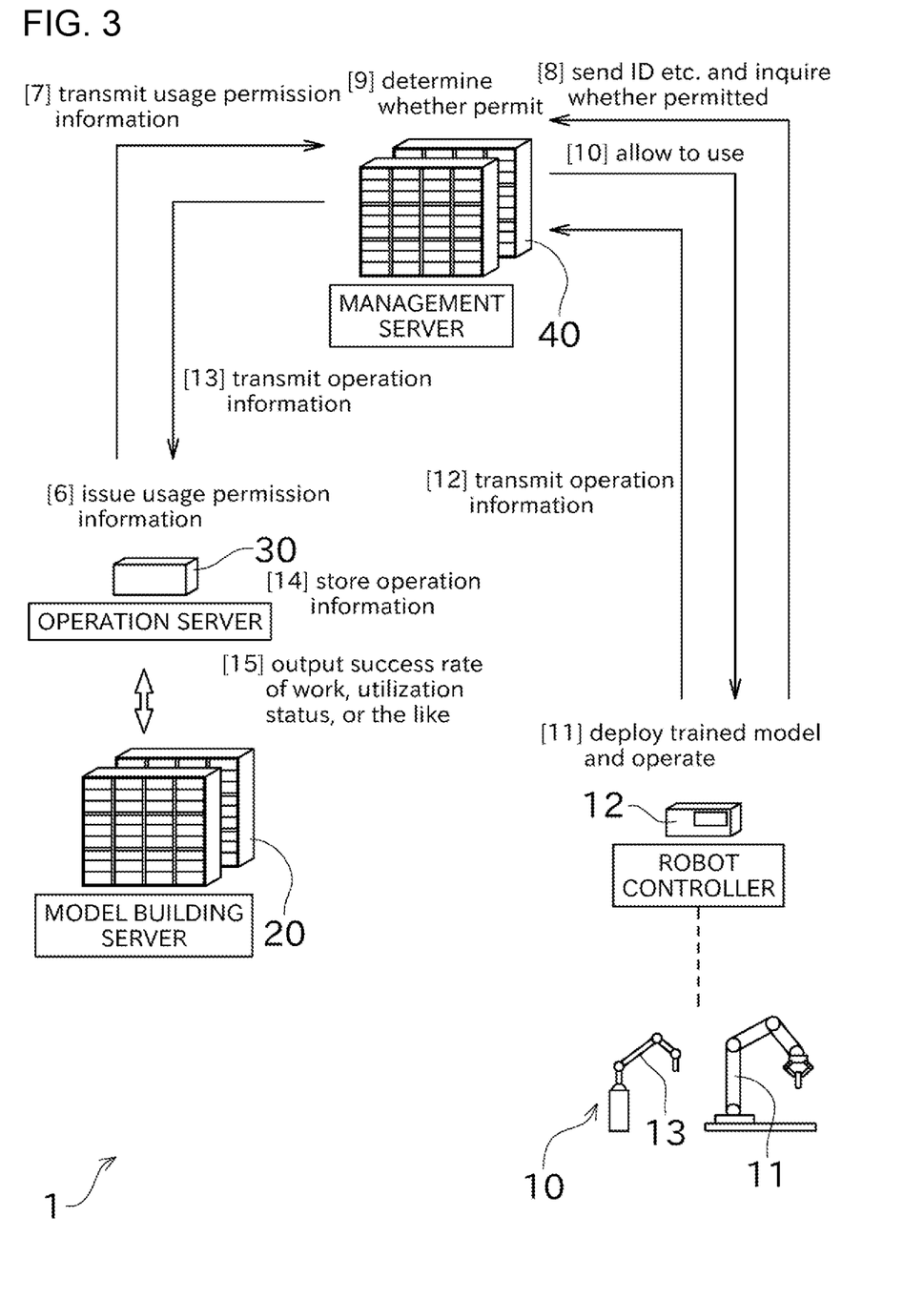
FIG. 3 is a schematic diagram illustrating a process for operating the built trained model in a robot system.

Next, an embodiment of the present invention will be described with reference to the drawings. FIG. 1 is a schematic diagram showing an overall configuration of a machine learning model operation management system 1 according to an embodiment of the present invention. FIG. 2 is a schematic diagram showing a process for building a trained model. FIG. 3 is a schematic diagram showing a process for operating the built trained model in the robot system 10.

The machine learning model operation management system 1 shown in FIG. 1 manages the operation of the machine learning model in the robot system 10. The machine learning model operation management system 1 includes a model building server 20, an operation server 30, and a management server 40.

The robot system 10 is a system that performs work using a robot 11. The work to be performed by the robot 11 can be various, for example, assembly, processing, painting, cleaning, and the like.

As will be described in detail below, the robot 11 is controlled using a model built by machine learning of data. As a result, the robot system 10 can basically perform work autonomously without the need for user assistance. In addition to performing a work autonomously, the robot 11 can also perform a work in response to user operations.

In the following description, a model built by machine learning may be referred to as a trained model (trained machine learning model). Also, the robot 11 performing a work autonomously may be referred to as autonomous operation, and the robot 11 performing a task in response to a user operation may be referred to as manual operation.

First, the robot system 10 will be described.

As shown in FIG. 1, the robot system 10 includes the robot 11, a robot controller 12, and an operation unit 13. Each of the robot 11 and the operation unit 13 is wired or wirelessly connected to each other to the robot controller 12, and can send and receive signals.

The robot system 10 (specifically, the robot controller 12) is configured to be able to communicate with each of the model building server 20 and the management server 40 described below via a communication network such as the Internet.

Although the type of the robot 11 is not limited, in the present embodiment, the robot 11 is a known master-slave articulated robot. The robot 11 includes an arm unit attached to a pedestal. The arm unit has a plurality of joints, and each joint is provided with an actuator. An end-effector selected according to the work to be performed is attached to the end of the arm unit. The end-effector is provided with an actuator. The robot 11 operates the actuators of the arm unit and the end-effector based on the control signals input from the robot controller 12. Therefore, the robot 11 can perform work.

Although not shown in the figures, sensors are provided with the robot 11 to detect the operation of the robot 11 and the surrounding environment and the like. The sensors can include, for example, a motion sensor, a force sensor, a camera, and the like. The motion sensor can detect a rotation angle or an angular velocity of each joint of the arm unit of the robot 11. The force sensor can detect a force received by the robot (e.g., a reaction force from a workpiece as a work object) during the operation of the robot. The camera can capture images of the robot 11 or a surrounding situation. However, the above description of sensors is exemplary, and some sensors can be omitted or other sensors can be added.

The motion sensor detects the motion of the robot 11. The force sensor and the camera detects the environment around the robot 11. In the following description, the combined information detected by these sensors may be referred to as state information. The state information indicates the state of the robot 11 and its surroundings.

The robot system 10 includes an operation unit 13. The operation unit 13 is used to manually operate the robot 11. The operation unit 13 may be located near the robot 11 or in a location sufficiently isolated from the robot 11. The operation unit 13 can be configured in various ways, for example, it can include levers, pedals, and the like.

Although not shown, the operation unit 13 includes an operation detection sensor. Although the configuration of the operation detection sensor is arbitrary, it may be, for example, a sensor that detects an operation position of the operation unit 13, a sensor that detects an operation force, a sensor that detects an acceleration, or the like. The operation detection sensor outputs the detection results to the robot controller 12.

The robot controller 12 is a known computer including a CPU and memory devices. Each of the memory devices can be categorized into a main memory or an auxiliary memory. The main memory can be, for example, a RAM. The main memory is connected to the main bus of the CPU or the like, and can be read/written at high speed. The auxiliary memory can be, for example, an HDD or an SSD. The auxiliary memory is connected to an external bus of the CPU, and can realize a large capacity storage, although reading/writing is slower than the main memory.

The auxiliary memory stores various software, such as a robot control program, a data collection program, a communication program, and a usage management program. Further, the auxiliary memory can store data of the trained model.

When the robot 11 operates in manual operation, the operation of the operation unit 13 by the user is detected by the operation detection sensor. The robot controller 12 generates control signals to operate the robot 11 according to the detection result of the operation detection sensor. Thereby, the robot 11 can be manually operated. In the following description, the detection result of the operation detection sensor may be referred to as operation information. The operation information indicates the operation of the user.

The robot controller 12 can collect the state information indicating the state of the robot 11 and its surroundings, and the operation information indicating the operation of the user when the robot 11 is operated manually to perform a task. As the result, the robot controller 12 can generate training data. The training data is used to build a trained model that operates in the robot controller 12. The building of the trained model is performed in the model building server 20 described below.

When the robot 11 operates in autonomous operation, the data of the trained model built in the model building server 20 is loaded in advance into the robot controller 12. The trained model operates in an inference phase to estimate the relationship between the input and the output. This allows the trained model to determine the robot's operation according to the situation. In this embodiment, the input is the state information and the output to be estimated is the operation information.

During autonomous operation, the robot controller 12 inputs the state information to the trained model. The robot controller 12 generates control signals to operate the robot 11 based on the estimated operation information which is output by the trained model. Thereby, the robot 11 can be operated autonomously.

As will be described in detail below, the robot controller 12 retrieves the trained model in an encrypted state from the model building server 20 and stores it in an auxiliary memory of the robot controller 12. In order to decrypt the encrypted trained model, a predetermined usage management program is installed in the robot controller 12 in advance.

In the process of installing the usage management program in the robot controller 12, a user of the robot controller 12 is required to register user identification information and controller identification information in advance with the management server 40. The user identification information is information for uniquely identifying the user. The user identification information may be, for example, an email address or a user registration number. The controller identification information is information for uniquely identifying the robot controller 12. The controller identification information may be, for example, a MAC address of a network adapter or a volume serial number of the auxiliary memory described above.

Next, the model building server 20 will be described.

The model building server 20 is a computer equipped with a CPU, a ROM, a RAM, an HDD, and the like. It is preferable if the computer is equipped with a GPU, because the learning described below can be performed in a short time.

In the present embodiment, the model building server 20 is realized by a plurality of computers that operate in cooperation while communicating with each other. The model building server 20 is installed in a data center operated by a manufacturer of the robot system 10. However, the model building server 20 may be realized by a single computer. The model building server 20 may be installed in a factory or other facility where the robot system 10 operates, or in a data center operated by a user of the robot system 10.

The model building server 20 is configured to be able to communicate with each of the robot system 10 (specifically, the robot controller 12) and the operation server 30 via a communication network such as the Internet.

The model building server 20 builds a trained model using the training data received from the robot controller 12. The building of the trained model corresponds to the training phase of machine learning.

To explain concretely, as shown in sequence number [1] of FIG. 2, the user causes the robot controller 12 to collect state information and operation information when the user performs work by manual operation in the robot system 10 so as to generate training data. Thereafter, as shown in sequence number [2], the user operates the robot controller 12 to transmit the training data to the model building server 20 and instructs it to build the trained model. At this time, information identifying the user who transmitted the training data is sent from the robot controller 12 to the model building server 20. The information identifying the user may be, for example, the user identification information described above. This user is treated as the creator of the data of the trained model.

The format of the machine learning model is not limited. For example, it may be a model using a neural network with a general configuration. In this case, the machine learning model includes an input layer, hidden layers, and an output layer. In each layer, a plurality of units that simulate brain cells are provided. The hidden layers are placed between the input layer and the output layer, and each of the hidden layers includes an appropriate number of intermediate units. Information flows in the order of the input layer, the hidden layers, and the output layer. The number of the hidden layers may be determined as appropriate.

Each input unit is connected to each intermediate unit by a path through which the information flows, and each intermediate unit is connected to each output unit by a path through which the information flows. In each path, the influence (weight) of the information of the upstream unit on the information of the downstream unit is set.

The model building server 20 builds the trained model as shown in sequence number [3]. Specifically, the model building server 20 inputs the state information included in the training data received from the robot controller 12 to the model, and compares the operation information output from the model with the operation information included in the training data (supervised learning). The model building server 20 updates the above weights by the backward propagation of errors method, which is a publicly known algorithm, so that the error between the two operation information becomes small. By iteratively performing the above process, learning can be achieved.

In general, the training phase requires a huge amount of computation. Therefore, if the building of the trained model is performed by the robot controller 12 itself, it is difficult to complete it in a realistic time. In this regard, in the present embodiment, the building of the trained model can be performed in a short time by making the model building server 20, for example, a large-scale computer resource specialized for machine learning. Accordingly, the building and operation of the trained model can be performed flexibly.

When training is completed, the model building server 20 automatically assigns to the trained model an ID that uniquely identifies the trained model. In the following, this ID may be referred to as a model ID. Thereafter, the model building server 20 transmits the data of the trained model together with the model ID to the robot controller 12, as shown in sequence number [4]. In this embodiment, the data of the trained model is, in effect, data indicating the weights between each unit of the neural network. The robot controller 12 stores the data of the trained model received from the model building server 20 in an auxiliary memory, as shown in sequence number [5].

In sequence number [4], the model building server 20 encrypts the data of the trained model as appropriate before sending it to the robot controller 12. Therefore, even if the robot controller 12 stores the data of the trained model in the sequence number [5], the robot controller 12 cannot use the trained model unless the decryption process is performed on the data. For encryption, a known encryption algorithm such as AES256, for example, can be used. The encryption is performed using asymmetric key cryptography, and the key pair of the encryption key and the decryption key is generated randomly, for example, at the model building server 20 so that it is different for each trained model. Accordingly, the decryption key for decrypting the encrypted trained model data is different for each trained model.

In sequence number [5], the data of the trained model is stored as one or more files in an auxiliary memory of the robot controller 12. Thus, the user can copy the file in which the data of the trained model is stored to another robot controller 12 by saving it to a removable storage medium, or send it to another computer by means of, for example, an e-mail attachment. However, if the trained model is not stored in the robot controller 12 where the usage management program described above is installed, or if the user does not have legitimate permission to use it, the trained model cannot be decrypted and cannot be substantially used.

Next, the operation server 30 will be described.

The operation server 30 shown in FIG. 1 is a computer equipped with a CPU, a ROM, a RAM, an auxiliary memory, and the like. The operation server 30 is configured to be able to communicate with each of the model building server 20 and the management server 40 via a communication network such as the Internet.

After the model building server 20 builds the trained model, the model building server 20 sends to the operation server 30 the model ID described above, the user identification information indicating the owner of the trained model, and information about the decryption key for decrypting the encrypted trained model. The operation server 30 stores the received information in a database.

The operation server 30 has a function of issuing permission to use the trained model. To explain concretely, when the model building server 20 completes building of the trained model, a user who is a creator of the trained model can specify usage conditions of the built trained model by accessing the operation server 30 using an appropriate client computer. The conditions of use may vary and may include, for example, a user who is permitted to use the model, a robot controller 12 who is permitted to use the model, a restriction on a period of use, a restriction on a number of uses, and the like. The user to be permitted to use can be specified using the user identification information described above. The conditions of use may include other conditions such as an upper limit number of robot controllers 12 that can be used simultaneously.

Based on the usage conditions specified by the user who is the creator of the trained model, the operation server 30 issues information indicating the permission to use the model, as shown in sequence number [6] of FIG. 3. Since this information uniquely identifies the permission to use, it can also be called a usage ID. The operation server 30 transmits the usage permission information to the management server 40, as shown in sequence number [7]. This usage permission information includes a model ID, the user identification information indicating a user whose use is permitted, the controller identification information indicating a robot controller whose use is permitted, a period of time during which use is permitted, a number of times during which use is permitted, the decryption key, etc.

In addition to the function of issuing the usage permission information, the operation server 30 has a function of managing operation status with respect to the trained model built by the model building server 20. The details of this function are described below.

Next, the management server 40 will be described.

The management server 40 is a computer equipped with a CPU, a ROM, a RAM, an HDD, and the like. The management server 40 is configured to be able to communicate with each of the robot system 10 (the robot controller 12) and the operation server 30 via a communication network such as the Internet.

With respect to the trained model built by the model building server 20, the management server 40 determines whether or not the robot system 10 can use the trained model, based on the usage permission information received from the operation server 30.

The following is a specific description by way of an example. Suppose that a user intends to make the robot 11 to perform the autonomous operation using the trained model stored in the robot controller 12. In the example shown in the figure, the user who intends to use the trained model and the user who is the creator of the trained model are the same, but of course they may be different.

The user who intends to use the trained model specifies the data of the trained model that is encrypted by operating the robot controller 12 appropriately. Then, as shown in sequence number [8], the usage management program of the robot controller 12 automatically accesses the management server 40. The program of the robot controller 12 sends the user identification information, the controller identification information, and the model ID of the target trained model. The program of the robot controller 12 inquires whether the user is permitted to use the model. As the user identification information and the controller identification information to be used for this inquiry, those registered when the usage management program is installed in the robot controller 12 are used.

When the management server 40 receives the query from the robot controller 12, it determines whether or not the legitimate usage permission exists, as shown in sequence number [9]. If it is determined that the legitimate usage permission exists, the management server 40 transmits to the robot controller 12 the statement that the robot controller 12 is permitted to use the model and transmits a decryption key of the trained model, as shown in sequence number [10]. The robot controller 12 which receives the decryption key decrypts the data of the trained model using the decryption key, as shown in sequence number [11], and deploys the decrypted data in the main memory of the robot controller 12. This makes the autonomous operation of the robot 11 by the trained model possible.

As described above, in the present embodiment, the data of the trained model is deployed to the main memory of the robot controller 12. Therefore, since there is almost no bottleneck in the input/output processing, the operation in the inference phase of the trained model is extremely fast, which is suitable for systems that require real-timeliness such as the control of the robot 11.

Normally, there is no other way to acquire the decryption key other than by the robot controller 12 fetching it from the management server 40 by the usage management program. Moreover, since decryption of the data of the trained model by the decryption key is performed internally by the usage management program, even if a user is permitted to use the decryption key, the user cannot see the decryption key. Therefore, even if the data of the trained model stored in the auxiliary memory of the robot controller 12 is duplicated in another robot controller 12, the trained model cannot be used outside the legitimate permission. As a result, the loss of business opportunities due to unauthorized copying of the trained model and the decrease in reliability due to inappropriate diversion of the trained model can be prevented.

The fact that a trained model has been specified for autonomous operation of the robot system 10, that the robot 11 starts/stops autonomous operation, and the like are transmitted from the robot controller 12 to the management server 40 at any time, as shown in sequence number [12]. This transmission is automatically performed by the usage management program of the robot controller 12. When the robot 11 fails in a work during the autonomous operation, a failure log (work log information) including the information that the work failed and the sensor information at that time is transmitted from the robot controller 12 to the management server 40. However, the contents of the failure log do not describe information as detailed as the training data described above. Therefore, the confidentiality of the failure log is not as high as that of the training data.

In the following, information indicating the operation status of the trained model, which is transmitted from the robot controller 12 to the management server 40, may be referred to as operation information. As described above, the operation information may include, for example, the date and time when the trained model is specified, the date and time when the autonomous operation starts/stops, the date and time when the operation succeeds, the date and time when the operation fails, and the failure log. However, the operation information is not limited to these, and various information can be transmitted from the robot controller 12 to the management server 40.

The operation information generated and transmitted by the robot controller 12 includes various information for managing the operation status. The information for managing the operation status can include, for example, the success rate of work when the autonomous operation is performed in the robot system 10 with the trained model, the utilization status of the autonomous operation of the robot system 10, and the like. The date and time of the start/stop of the autonomous operation described above is an example of information indicating information on the utilization status of the autonomous operation.

The management server 40 forwards the operation information received from the robot controller 12 to the operation server 30 in a form creating relationships to the user identification information and the controller identification information, as shown in the sequence number [13]. The operation server 30 stores the operation information as shown in sequence number [14]. Specifically, the operation server 30 stores the operation information in a database in a form creating a relationship to the model ID.

By configuring as described above, the operation server 30 can collect various types of information. Thus, for example, a user who is an owner of a trained model can know information such as which robot system 10 (robot controller 12) of which user used the trained model by accessing the operation server 30 using a suitable client computer.

The user who is the owner of the trained model can also change the contents of the permission to use already issued for the trained model by accessing the operation server 30 and operating it accordingly. The change in the permission to use includes revocation of the permission. When the permission to use is changed, the operation server 30 reissues the usage permission information and sends it to the management server 40. The management server 40 determines whether or not the trained model is available based on the new usage permission information.

The user who is an owner of the trained model can also remotely instruct the deletion of the data of the trained model by accessing the operation server 30 and operating it accordingly. A data deletion command is transmitted from the operation server 30 to the management server 40. Thereafter, when the management server 40 receives an inquiry from the robot controller 12 as to whether or not the relevant trained model can be used, it sends a command to delete the data of the trained model to the robot controller 12 together with a statement that the model cannot be used. Upon receiving this, the usage management program of the robot controller 12 automatically deletes the file in which the data of the corresponding trained model is saved from the auxiliary memory. This can greatly enhance security.

Next, the monitoring function of the operation server 30 will be described.

Specifically, the operation server 30 outputs various information for managing the operation status, as shown in sequence number [15] of FIG. 3. The information for managing the operation information is generated by the robot controller 12 and transmitted from the robot controller 12 to the operation server 30 via the management server 40.

As described above, the information for managing the operation status can include, for example, the success rate of work when the autonomous operation is performed in the robot system 10 with the trained model, the utilization status of the autonomous operation of the robot system 10, and the like. In addition, the operation server 30 can also output a failure log when the autonomous operation of the robot system 10 fails.

A user having special privilege (e.g., a person in charge of the manufacturer of the robot controller 12) can view the above information by connecting to the operation server 30 using a suitable client computer. With this information, for example, if the performance of a certain trained model is better or worse than before, the user can notice the change. Accordingly, it is easy to provide useful advice to users of the robot system 10 using the trained model regarding operation and improvement of the trained model. In particular, the person in charge of the manufacturer of the robot controller 12 can consider the necessity of retraining the trained model based on the information viewed and advise the user of the robot system 10. The above information may be viewable by a user who is the owner of the trained model, or a user who is permitted to use the trained model.

In the machine learning model operation management system 1 configured as described above, the building of the trained model is performed in the model building server 20, which is a server physically different from the operation server 30 and the management server 40. Building the trained model requires the training data, and the training data is a detailed record of the situation by sensors and contains highly important and confidential information. The data of the trained model is likewise information of high security value. In this regard, by making the model building server 20 a server operated by the manufacturer of the robot system 10 or a server operated by the user who wants to build the trained model, the anxiety of important information being leaked to the outside can be mitigated and the user can be given a sense of security. On the other hand, information having relatively low security value, such as model IDs and utilization status information, can be handled by the operation server 30 and the management server 40 in a different location from the model building server 20, thereby enhancing convenience. In addition, by constructing the operation server 30 and the management server 40 using, for example, a cloud computing service, the overall cost can be reduced.

By the way, the training data is acquired by actually operating the robot 11 and detecting the state of the robot 11 and the surrounding by sensors. Therefore, the trained model built based on the training data reflects the performance of the actuators and sensors of the robot 11 at that time. On the other hand, the performance of the actuators and sensors changes somewhat as they are used over many years. Therefore, it is conceivable that a trained model that showed good performance at a certain point in time may not achieve the initial performance with the passage of time. It is also conceivable that the work to be performed by the robot 11 may change. Therefore, for the robot system 10 using the trained model, it is necessary to monitor the situation as appropriate and take necessary measures even after the start of operation in order to continuously demonstrate good performance.

In this regard, in the present embodiment, for example, a service person of the manufacturer of the robot system 10 can access the operation server 30 to view the success rate of work, utilization status, failure log, and the like of the robot 11 by autonomous operation using the trained model. Accordingly, the manufacturer of the robot system 10 can make appropriate proposals to the user with respect to the retraining of the trained model and the timing thereof, the replacement of the end-effector, the replacement of the actuator and the sensor, and the like. This facilitates the operation of the robot system 10 by the user and reduces the burden on machine learning.

The management of the permission to use and information, etc. in the operation server 30 and the management server 40 can be performed for each trained model (in other words, for each model ID). Accordingly, when a user builds a plurality of trained models, each of the trained models can be appropriately managed. In the case where a plurality of trained models are built and stocked, for example, if a user has built a trained model in the past for a work that is similar to the work that the user wants the robot 11 to perform, the user can divert the trained model. In this case, the user can operate the robot system 10 with a sense of security by using the trained model that has performed the work in the past. Also, the time and effort required to prepare the training data can be reduced.

The model ID of the trained model is stored in the database of the management server 40 in correspondence with the user identification information indicating the owner. This makes it possible to figure out who the owner of the trained model is. Also, by changing the mapping between the model ID and the user identification information, the ownership of the trained model can be transferred from one user to another.

In this way, in the machine learning model operation management system 1, the transfer of ownership of the trained model can be realized on the data. Accordingly, a user can obtain a profit opportunity when transferring a trained model created by the user to another user. Thus, the machine learning model operation management system 1 of this embodiment is suitable for use as a foundation for AI content business.

The operation information of the trained model stored in the management server 40 can include the date and time when the operation of the trained model in the robot system 10 was started and the date and time when the operation was stopped. This information can be used as a basis for charging a cost when a user who is a creator of the trained model permits other users to use the model on a pay-as-you-go basis (e.g., on a time-based basis). The pay-as-you-go business model, in which the user pays only for what he or she uses, has the advantage of being easy to convince the user who uses based on the permission. The machine learning model operation management system 1 of the present embodiment can be suitably applied to such pay-as-you-go billing, so that the range of earnings of the user via AI contents can be expanded in a good manner.

As described above, the machine learning model operation management system 1 of the present embodiment includes the model building server 20, the operation server 30, and the management server 40. The model building server 20 receives the training data. The training data is data for making a machine learning model to train the operation of the robot 11. The model building server 20 builds the trained model based on the training data. When the trained model stored in the robot controller 12 operates (in an inference phase) for determining the operation of the robot, the operation server 30 receives the operation information generated by the robot controller 12. The robot controller 12 inquires whether the robot controller 12 has the permission to use the trained model stored in itself by sending the model ID that uniquely identifies the trained model. If the robot controller 12 has the permission to use the trained model, the robot controller 12 makes the trained model available for use. The management server 40 can communicate with the robot controller 12. The management server 40 determines whether or not the robot controller 12 has the permission to use the trained machine learning model. The management server 40 allows the robot controller 12 that has the permission to use the trained machine learning model. The operation server 30 stores the operation information in association with the model ID.

This allows the model building server 20 to be operated at a location that the user can trust. Therefore, the user can send the training data with confidence to the model building server 20 to build the trained machine learning model. On the other hand, the operation server 30 does not store the data of the trained machine learning model, but only uses the information that uniquely identifies the model. In addition, by not including highly confidential information in the operation information sent from the robot controller 12 for making the operation server 30 to store, the necessity of locating the operation server 30 in a place with strict security becomes small. As a result, the construction cost and the running cost of the system can be reduced.

Also, in the machine learning model operation management system 1 of the present embodiment, the operation server 30 is capable of outputting information for managing the operation status of the robot 11 operated by the trained model.

This allows, for example, to figure out the success rate of work when the robot 11 performs the autonomous operation, so that effective monitoring can be realized. Also, for example, by looking at changes in the success rate of work, etc. over time, it is easy to notice situations in which the operation of the trained model should be improved.

In the machine learning model operation management system 1 of the present embodiment, the operation information generated by the robot controller 12 includes the work log information of the robot operated by the trained machine learning model. The operation server 30 is capable of outputting the work log information (e.g., a failure log when the work fails).

This allows specific situations to be analyzed by the work log information, so that concrete methods for improving the operation of the trained model can be easily considered.

In the machine learning model operation management system 1 of the present embodiment, the robot controller 12 includes the main memory and the auxiliary memory. When the robot controller 12 has the permission to use the trained model as a result of inquiring whether the robot controller 12 has the permission to use the trained model stored in the auxiliary memory, the robot controller 12 deploys the trained model to the main memory. The robot controller 12 operates the robot 11 based on output of the trained model deployed in the main memory.

As a result, the operation in the inference phase of the trained model is performed at an extremely high speed, which is suitable for controlling the robot 11 where real-timeliness is required.

In addition, in the present embodiment, the operation management of the trained model is performed in the following manner. That is, this operation management method includes a model building process, a preparation process, and an operation information receiving process. In the model building process, the model building server 20 receives training data, which is data for training the machine learning model to train the operation of the robot 11, and builds the trained model based on the training data. In the preparation process, the robot controller 12 inquires whether the robot controller 12 has the permission to use the trained model stored in itself by sending the model ID, which is information that uniquely identifies the trained model, and if the robot controller 12 has the permission to use the trained model, the robot controller 12 makes the trained model available for use. In the operation information receiving process, when the trained model stored in the robot controller 12 operates to determine the operation of the robot, the operation server 30 receives the operation information generated by the robot controller 12. In the operation information receiving process, the operation server 30 stores the operation information in association with information (model ID) that uniquely identifies the trained model.

By operating the model building server 20 at a location that the user can trust, the user can send the training data with confidence to the model building server 20 to build the trained machine learning model. On the other hand, the operation server 30 does not store the data of the trained machine learning model, but only uses the information that uniquely identifies the model. In addition, by not including highly confidential information in the operation information sent from the robot controller 12 for making the operation server 30 to store, the necessity of locating the operation server 30 in a place with strict security becomes small. As a result, the construction cost and the running cost of the system can be reduced.

Although a suitable embodiment of the present invention has been described above, the above configuration can be modified, for example, as follows.

The user, who is the owner of the trained model, may set and change the permission to use on the management server 40 instead of the operation server 30.

The robot controller 12 may transmit the operation information directly to the operation server 30.

The operation server 30 may perform the determination of whether or not the robot controller 12 is permitted to use the trained machine learning model instead of the management server 40. For example, the operation server 30 may communicate directly with the robot controller 12 to allow the robot controller 12 to use the trained machine learning model. The determination of the permission to use may be configured to be performed by both the management server 40 and the operation server 30. The same applies to allowance for use.

The operation server 30 and the management server 40 may be integrated to form a single server.

In the above embodiments, a model ID is used when the robot controller 12 inquires the management server 40 whether it is permitted to use the model. However, as information for uniquely identifying the trained model, something different from the model ID assigned by the model building server 20 may be used. For example, instead of the model ID, a hash value of a file in which data of the trained model is saved can be sent to the management server 40 to inquire whether or not it is permitted to use the file. The hash value can be calculated using a known algorithm. The hash value can also be used as information to uniquely identify the trained model in the operation server 30.

The transmission of the work log information from the robot controller 12 to the management server 40 is not limited to cases where the robot 11 fails to perform the work, but may also be performed in cases where the robot 11 succeeds.

The usage permission information can be set so that each usage permission information (the usage ID) permits only one time use of the trained model. In this case, a business model can be implemented such that a user purchases a ticket for the number of times they wish to use the model.

Instead of estimating the relationship between the state information and the operation information, the trained model may estimate the relationship between the state information and the control signals to the robot 11.

DESCRIPTION OF THE REFERENCE NUMERALS

1 machine learning model operation management system
11 robot
12 robot controller
20 model building server
30 operation server
40 management Server

The invention claimed is:

1. A machine learning model operation management system comprising:
   a model building server that receives training data which is data for making a machine learning model to train an operation of a robot, and builds a trained machine learning model based on the training data; and
   an operation server that receives operation information generated by a robot controller when the trained machine learning model operates for determining the operation of the robot, the trained machine learning model stored in the robot controller, wherein
   the robot controller transmits externally an inquiry as to whether the robot controller has permission to use the trained machine learning model stored in the robot controller, the inquiry including model identification information that uniquely identifies the trained machine learning model, and if the robot controller has the permission to use, the robot controller makes the trained machine learning model available for use by the robot controller, and the operation server stores the operation information in association with information that uniquely identifies the trained machine learning model.

2. A machine learning model operation management system comprising:
a model building server that receives training data, which is data for making a machine learning model to train an operation of a robot, and builds a trained machine learning model based on the training data;
an operation server that receives operation information generated by a robot controller when the trained machine learning model operates for determining the operation of the robot, the trained machine learning model stored in the robot controller; and
a management server that can communicate with the robot controller, wherein
at least one of the management server and the operation server determines whether or not the robot controller has permission to use the trained machine learning model, and allows the robot controller having the permission to use the trained machine learning model, and
the operation server stores the operation information in association with information that uniquely identifies the trained machine learning model.

3. The machine learning model operation management system according to claim 1, wherein
the operation server is capable of outputting information for managing operation status of the robot operated by the trained machine learning model.

4. The machine learning model operation management system according to claim 1, wherein
the operation information includes work log information of the robot operated by the trained machine learning model, and
the operation server is capable of outputting the work log information.

5. The machine learning model operation management system according to claim 1, wherein
the robot controller includes a main memory and an auxiliary memory,
when the robot controller has the permission to use the trained model as a result of inquiring whether the robot controller has the permission to use the trained model stored in the auxiliary memory, the robot controller deploys the trained machine learning model to the main memory, and
the robot controller operates the robot based on output of the trained machine learning model deployed in the main memory.

6. A machine learning model operation management method comprising:
a model building process in which a model building server receives training data which is data for making a machine learning model to train an operation of a robot, and builds a trained machine learning model based on the training data;
a preparation process in which a robot controller transmits externally an inquiry as to whether the robot controller has permission to use the trained machine learning model stored in the robot controller, the inquiry including model identification information that uniquely identifies the trained machine learning model, and if the robot controller has the permission to use, the robot controller makes the trained machine learning model available for use by the robot controller; and an operation information receiving process in which an operation server receives operation information generated by the robot controller when the trained machine learning model operates for determining the operation of the robot, the trained machine learning model stored in the robot controller, wherein
in the operation information receiving process, the operation server stores the operation information in association with information that uniquely identifies the trained machine learning model.

7. The machine learning model operation management system according to claim 2, wherein
the operation server is capable of outputting information for managing operation status of the robot operated by the trained machine learning model.

8. The machine learning model operation management system according to claim 2, wherein
the operation information includes work log information of the robot operated by the trained machine learning model, and
the operation server is capable of outputting the work log information.

9. The machine learning model operation management system according to claim 3, wherein
the operation information includes work log information of the robot operated by the trained machine learning model, and
the operation server is capable of outputting the work log information.

10. The machine learning model operation management system according to claim 7, wherein
the operation information includes work log information of the robot operated by the trained machine learning model, and
the operation server is capable of outputting the work log information.

11. The machine learning model operation management system according to claim 2, wherein
the robot controller includes a main memory and an auxiliary memory,
when the robot controller has the permission to use the trained model as a result of inquiring whether the robot controller has the permission to use the trained model stored in the auxiliary memory, the robot controller deploys the trained machine learning model to the main memory, and
the robot controller operates the robot based on output of the trained machine learning model deployed in the main memory.

12. The machine learning model operation management system according to claim 3, wherein
the robot controller includes a main memory and an auxiliary memory,
when the robot controller has the permission to use the trained model as a result of inquiring whether the robot controller has the permission to use the trained model stored in the auxiliary memory, the robot controller deploys the trained machine learning model to the main memory, and
the robot controller operates the robot based on output of the trained machine learning model deployed in the main memory.

13. The machine learning model operation management system according to claim 4, wherein
the robot controller includes a main memory and an auxiliary memory, when the robot controller has the permission to use the trained model as a result of inquiring whether the robot controller has the permission to use the trained model stored in the auxiliary memory, the robot controller deploys the trained machine learning model to the main memory, and the robot controller operates the robot based on output of the trained machine learning model deployed in the main memory.

14. The machine learning model operation management system according to claim 7, wherein the robot controller includes a main memory and an auxiliary memory, when the robot controller has the permission to use the trained model as a result of inquiring whether the robot controller has the permission to use the trained model stored in the auxiliary memory, the robot controller deploys the trained machine learning model to the main memory, and the robot controller operates the robot based on output of the trained machine learning model deployed in the main memory.

\* \* \* \* \*